United States Patent [19]
Schneiter

[11] Patent Number: 5,293,778
[45] Date of Patent: Mar. 15, 1994

[54] FLUID FLOW MEASURING SYSTEM

[75] Inventor: John L. Schneiter, Latham, N.Y.

[73] Assignee: General Electric Company, Schenectady, N.Y.

[21] Appl. No.: 67,926

[22] Filed: May 27, 1993

[51] Int. Cl.⁵ ............................................. G01F 15/00
[52] U.S. Cl. ..................... 73/198; 73/118.1; 73/861
[58] Field of Search ..................... 73/198, 861, 861.42, 73/861.52, 118.1

[56] References Cited

U.S. PATENT DOCUMENTS 5,146,902 9/1992 Cook et al. .......................... 73/118.1
5,203,204 4/1993 Miyazaki et al. ................... 73/118.1

Primary Examiner—Richard E. Chilcot, Jr.
Assistant Examiner—Harshad Patel
Attorney, Agent, or Firm—Marvin Snyder

[57] ABSTRACT

A system for measuring fluid flow through a plurality of holes in a part, such as an engine combustor part, comprises a hood, including a leak-resistant seal, the seal being capable of receiving or engaging an inner or outer side of the wall of the part; a pump or variable pressure blower coupled to the hood by a fluid flow line; a pressure sensor to measure pressure inside the hood; a controller coupled to the pump or blower to establish a predetermined pressure inside the hood in response to the pressure sensor, and a flow sensor in the fluid flow line to measure the fluid flow rate through the fluid flow line.

20 Claims, 4 Drawing Sheets

FLUID FLOW MEASURING SYSTEM

FIELD OF THE INVENTION

The invention is generally directed toward measuring fluid flow and, more particularly, measuring fluid flow through a plurality of holes in a combustor liner or part for a gas turbine or aircraft engine.

BACKGROUND OF THE INVENTION

Inner or outer engine combustor liners are typically substantially circularly radially symmetrical. Furthermore, such combustor liners or parts for aircraft engines or gas turbines typically require a plurality of holes, often thousands, having a small diameter and being precisely placed to satisfy stringent fluid flow requirements desirable for satisfactory engine operation. One problem associated with the fluid flow requirements for such engine combustor parts is the capability to measure fluid flow in the relevant dynamic range of flows, given a predetermined pressure differential. More particularly, measuring the effect on the fluid flow of a misplaced or poorly formed hole in the part generally exceeds the capabilities of present fluid flow sensor technology, such as on the order of 0.030 lbs.mass/second for a row of holes or about 75 cubic feet per minute. Yet another problem is satisfactorily testing the part in a manner that addresses the large fluid or air flows associated with the operation of such an engine liner or part. Thus, large and costly flow test installations are frequently necessary for "full" flow testing of the combustor parts.

One approach to solving these problems has included performing random "spot checks" of hole diameters using gauge pins to assist in making adjustments to the drilling, usually performed by a laser beam, to fabricate or form the holes. A full flow test may then be performed on the finished part at a "flow" test installation or laboratory, as described above; however, this approach has several disadvantages. First, hole diameter checking using gauge pins is notoriously inexact, and furthermore may not provide a true indication of fluid flow. Likewise, such a technique fails to take into account hole taper, hole angle of orientation with respect to the part wall, or other possible hole fabrication anomalies other than hole size that may also affect flow. Furthermore, once the part is capable of being "fully" flow tested, modifications or corrections to the part are not feasible and the part must ultimately be scrapped if it does not perform within desired specifications. A need thus exists for an alternative method or apparatus to measure the fluid flow through holes in an engine combustor part or liner that satisfactorily overcomes these problems.

SUMMARY OF THE INVENTION

One object of the invention is to provide a technique or system for measuring fluid flow through holes in an engine combustor part that avoids scrapping or costly reworking of the part.

Yet another object of the invention is to provide a technique or system for measuring the "in-process" fluid flow through holes in an engine combustor part without requiring that the part be dismounted from the drilling apparatus or system during the flow measurement process.

One more object of the invention is to provide a method or system for measuring the fluid flow through holes in an engine combustor part that permits some variation in the cross-sectional shape of the part being tested taken along a plane substantially perpendicular to the major or primary axis of the part.

Briefly, in accordance with one embodiment of the invention, a system for measuring fluid flow through a plurality of holes in a part comprises: a hood, including a leak-resistant seal, the seal being capable of receiving or engaging an inner or outer side of a wall of the part; a pump or variable pressure blower coupled to the hood by a fluid flow line; a pressure sensor port coupled to a pressure sensor adapted to measure pressure inside the hood when the pump or blower is operating to affect the pressure inside the hood; a controller coupled to the pump or blower and adapted to establish a predetermined pressure inside the hood in response to the pressure sensor, and a flow sensor in the fluid flow line adapted to measure the fluid flow rate through the fluid flow line.

BRIEF DESCRIPTION OF THE DRAWINGS

The subject matter regarded as the invention is particularly pointed out and distinctly claimed in the concluding portion of the specification. The invention, however, both as to organization and method of operation, together with further objects and advantages thereof, may best be understood by reference to the following detailed description when read with the accompanying drawings in which:

DETAILED DESCRIPTION OF THE INVENTION

Figure 1:
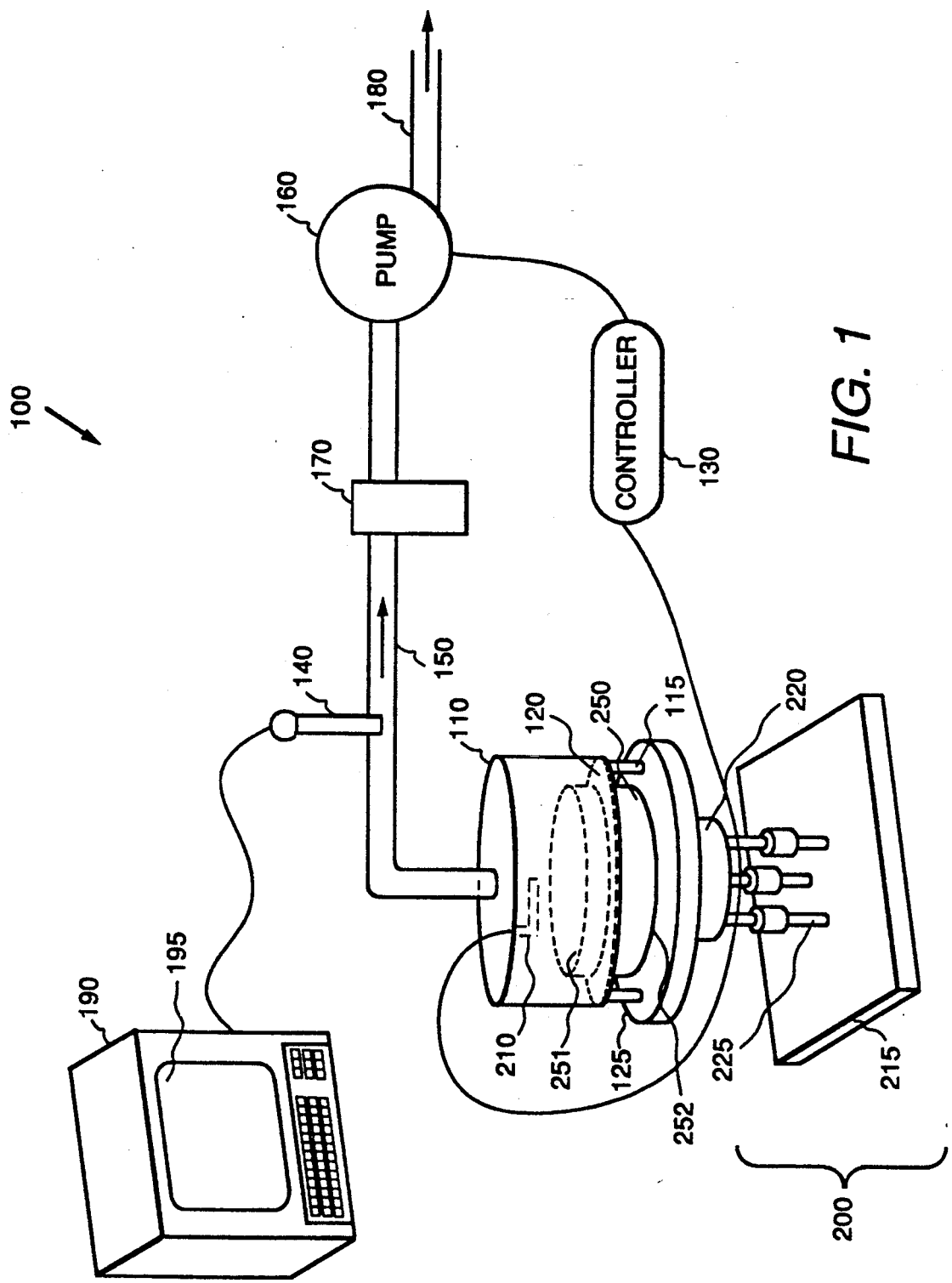
FIG. 1 is a schematic diagram illustrating one embodiment of a fluid flow measuring system in accordance with the invention.
Figure 3:
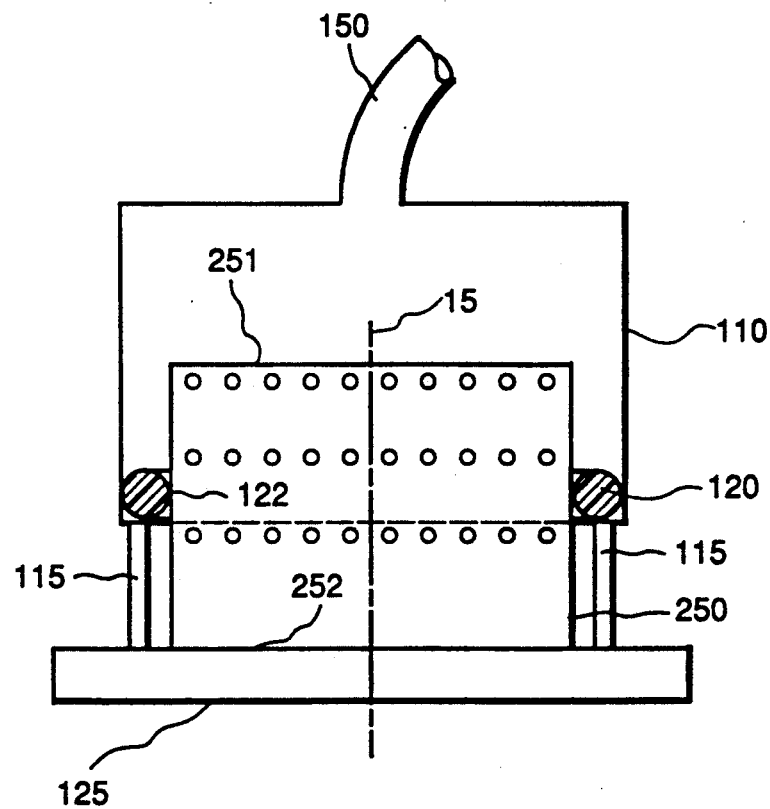
FIG. 3 is a schematic diagram illustrating a portion of the embodiment illustrated in FIG. 1 in greater detail.

FIG. 1 illustrates an apparatus or system 100 for measuring fluid flow through a plurality of holes in an engine combustor liner or part 250. In the context of the invention, the term "fluid" refers to matter in the liquid or gaseous state; however, as will be appreciated, typically an engine combustor liner or part will be designed to operate in an environment in which it is substantially surrounded by air. As illustrated in FIG. 3, part 250 is substantially circularly radially symmetrical with respect to a primary or major axis 15. Thus, as illustrated, part 250 is formed by a single two-sided wall having an inner and an outer side. Depending on the part, the holes may also taper with respect to the inner side or the outside. The holes in the part each extend from the inner side to the outer side. Part 250 may typically comprise, for example, a thin-walled cylinder or cone, such as the cylinder illustrated in FIG. 3. It will be appreciated that typically part 250 is open at both its top and bottom ends, 251 and 252, respectively; however, it may in some circumstances only be open at one end. Where part 250 is open at both ends, one end of the part should be sealed, as described hereinafter, for use in a fluid flow measuring system. Although part 250 is substantially circularly radially symmetrical, the diameter of the part with respect to the major axis may vary along the length of the axis. Furthermore, the shape of the cross-section of the part taken along a plane substantially perpendicular to the major axis of the part is not limited in scope to being substantially circularly radially symmetrical. More particularly, subject to limitations imposed by providing a satisfactory seal, as described hereinafter, any substantially "smooth" closed shape or figure will suffice, such as convex shapes, concave shapes, elliptical shapes, oval shapes and others.

Figure 5:
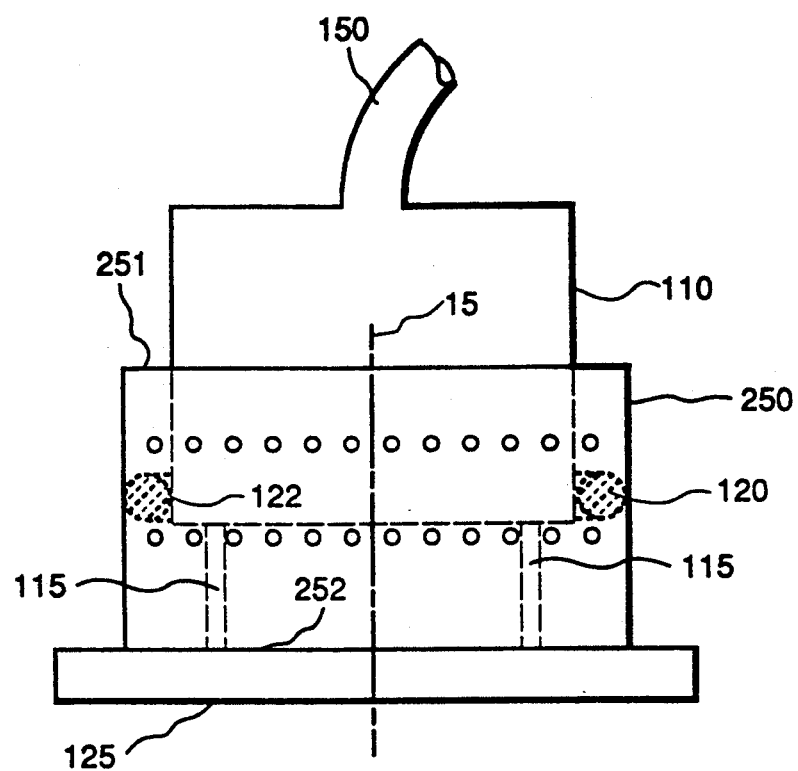
FIG. 5 is a schematic diagram illustrating a portion of an alternative embodiment of a fluid flow measuring system in accordance with the invention.

System 100 may comprise a leak-resistant hood 110 having a cavity adapted to receive a portion of the top end, 251, of part 250. The hood may include an inflatable leak-resistant seal 120 adapted to engage the engine combustor part upon being inflated so as to resist the leakage of a substantial amount of fluid between the wall of the part and the seal. As illustrated, the seal lines the inside of the opening of the cavity. The seal illustrated is a radially inward pneumatically inflatable seal, although the invention is not limited in scope to this particular type of seal. Thus, as illustrated, in this embodiment the seal engages the outer side of the wall of the part. Any seal capable of receiving and engaging the part so as to create a differential pressure between the sealed volume inside the hood cavity and the ambient environment outside the hood cavity may suffice, such as hydraulic seals or other radially directed inflatable seals, such as a radially outward pneumatically inflatable seal. Likewise, depending on the particular embodiment, in operation the pressure inside the hood cavity may exceed the pressure outside or the pressure outside the hood cavity may exceed the pressure inside. The surface of the seal should be in direct contact with the part wall with a sufficient force so that the seal is resistant to leaks of the particular fluid between the "seal-part" interface. For example, a radially outward pneumatically inflatable seal would engage the inner side of the wall of the cylinder. In such an embodiment, the seal would line the outside of the hood cavity opening rather than the inside and hood 110 would extend into the interior of part 250, such as illustrated in FIG. 5.

Hood 110 further includes a pressure sensor 210 being adapted to measure the pressure inside the hood cavity when seal 120 is inflated with respect to part 250 and a pressure differential exists between the sealed volume inside the hood cavity and the ambient atmospheric environment outside the hood cavity. Alternatively, a pressure sensor port may be incorporated into hood 110 and coupled to a pressure sensor external to the hood. It will be appreciated that sensor 210 may either measure the absolute pressure inside the hood cavity or the differential pressure between the pressure inside the hood cavity and the pressure outside the hood cavity. It is the pressure differential that primarily produces the fluid or mass flow described hereinafter.

System 100 also includes controller 130 responsive to pressure sensor 210 to establish either a predetermined absolute pressure inside the hood or a predetermined differential between the pressure inside hood 110 and outside the hood by controlling a pump, such as variable pressure blower 160. Variable pressure blower 160 may take any one of a number of embodiments, although the embodiment of a fluid flow measuring system in accordance with the present invention illustrated includes a centrifugal blower. Variable pressure blower 160 is thus responsive to controller 130 and coupled thereto. In the embodiment illustrated in FIG. 1, a fluid flow line 150 pneumatically couples hood 110 to blower 160. That is, as illustrated in FIG. 1, a pneumatic circuit is established. Nonetheless, alternatively, depending on the fluid, a hydraulic circuit or hydraulic coupling may be employed. Blower 160 operates to establish a differential pressure between the sealed volume inside the hood and the ambient environment outside the hood. As a result of this differential pressure, fluid or mass flow takes place in fluid flow line 150. It will be appreciated that the direction of the flow depends on the pressure differential. A fluid flow sensor 140 is incorporated into flow line 150 and is adapted to measure the fluid flow rate through line 150 during the operation of system 100.

A number of embodiments of pressure flow hood 110 are possible. One such embodiment comprises a Plexiglass acrylic plastic or LEXAN ®-polycarbonate resin cylindrical shaped isolation hood. Anyone of a number of materials and shapes would prove satisfactory to provide sufficient isolation from the ambient atmospheric environment to establish the differential pressure desired. For example, metals, such as steel or iron, glass, ceramic, or any other material capable of supporting a vacuum will suffice. Likewise, for an inward seal so long as the hood is capable of receiving the cross-sectional shape of the end of the part, such as a circularly radially symmetrical shape, any shape for the external surface of the hood in addition to a cylindrical shape will suffice, such as rectangular, elliptical or circular, so long as the seal, such as a pneumatic seal, is capable of engaging and sealing against the part satisfactorily.

In this particular embodiment, as illustrated, the hood should be positioned vertically relative to the part and, more particularly, relative to the location at which seal 120 is sealed against part 250. As illustrated in FIG. 3, a seal contact point 122 is formed by the inflatable seal 120 against part 250 immediately above the last-drilled or most remote row of holes from top end 251 and from the hood so as to isolate that row for flow testing. Vertical spacers 115 for positioning the hood relative to a substantially flat surface, such as plate 125, may accomplish this result, as illustrated in FIG. 1. Likewise, due to the pressures created inside the hood cavity, during operation of the flow measuring system, the hood and part have a tendency to move towards each other. Thus, the spacers assist in maintaining a predetermined distance between the hood and the part when the part is rigidly fixed or attached to the plate, thus providing the capability to resist this tendency during operation of the fluid flow measuring system. Again the shape or composition of the spacers is not critical to the invention. For example, a toroid or doughnut-shaped spacer would suffice. As illustrated in FIGS. 1 and 3, the edge of plate 125 extends radially beyond the wall of the part so that the spacers may directly contact the hood at one end and directly contact the plate at the other end, thereby maintaining the desired predetermined distance. Alternatively, a pneumatically or hydraulically controlled spacer system for adjusting the height of the hood relative to seal contact point 122 may be provided. Nonetheless, the invention is not restricted in scope to this orientation between the hood and the part. For example, the hood may be positioned below the part so long as the central or primary axes of the hood and the part are substantially parallel. Furthermore, the system is not restricted to the vertical orientation between the hood and the part illustrated.

As illustrated in FIG. 1 and previously described, hood 110 incorporates pressure sensor 210 or a pressure sensor port coupled to a pressure sensor. Likewise, as previously described, pressure sensor 210 is adapted to measure pressure when seal 120 is inflated with respect to the wall of part 250 and blower 160 is operating to establish a predetermined differential pressure between the sealed volume inside the hood cavity and the ambient environment or the environment external to the hood cavity. Details regarding the relationship between absolute or differential pressure and fluid flow are described in *Introduction to Fluid Mechanics*, written by J. E. A. John and W. Haberman, and available from Prentice-Hall (1971), herein incorporated by reference. In this particular embodiment, pressure sensor 210 comprises an Omega Company PX150-025-DI differential pressure transducer. Other possible embodiments are described in *Measurement Systems: Application and Design*, written by E. O. Doebelin, and available from McGraw-Hill (1983), herein incorporated by reference.

FIG. 1 illustrates controller 130 as being responsive to pressure sensor 210 to establish a predetermined absolute pressure in hood 110 or a predetermined differential pressure between the sealed volume inside of hood 110 and the ambient environment. As illustrated, controller 130 controls pump or blower 160 in order to establish this predetermined absolute or differential pressure. Thus, controller 130 may control the speed of the blower to affect the pressure being established inside the hood cavity. Any one of a number of embodiments of the controller would provide satisfactory performance in the context of the invention. For example, controller 130 may comprise an off-the-shelf industrial process controller or a conventional proportional integral differential (PID) controller, such as an Omega Company EO-5040 microprocessor-based controller. Alternatively, the controller may comprise conventional digital or analog circuitry, such as designed in accordance with conventional control principles, as described in *Modern Control Engineering*, (1970), by K. Ogata, available from Prentice-Hall, Inc., or *Linear Systems*, (1980), by T. Kailath, also available from Prentice-Hall, Inc. The controller may comprise a microprocessor incorporating a closed loop feedback control algorithm. Furthermore, the closed loop feedback control algorithm may comprise a fuzzy logic feedback control algorithm, such as described in *Fuzzy Systems Theory and Its Applications*, written by T. Terano, K. Asai, M. Sugano, and available from Academic Press (1992), herein incorporated by reference, or a network, such as described in *Neural and Concurrent Real-Time Systems: The Sixth Generation*, written by B. Sovcek, and available from J. Wiley & Sons (1989), herein incorporated by reference.

Figure 2:
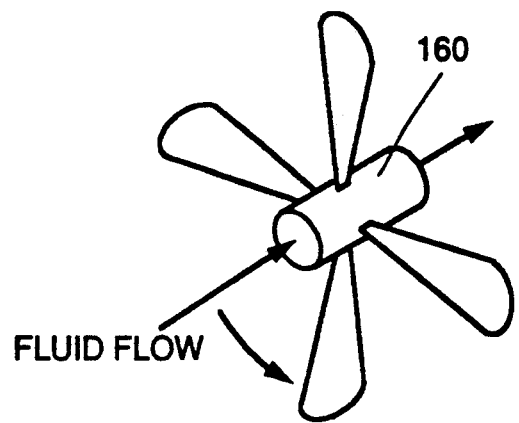
FIG. 2 is a schematic diagram illustrating one embodiment of a variable pressure blower for incorporation in a fluid flow measuring system in accordance with the invention.

Pump or blower 160 is coupled to controller 130, responsive thereto, and employed to establish a predetermined absolute or differential pressure in hood 110, as desired. One variable pressure blower comprises a Fuji Ring Blower, model VFC303A powered by a Woods Company "E-Trac" three-phase AC inverter. Thus, the speed of the rotation of the blower blades may, for example, be affected by modifying electrical parameters of the blower that affect the speed of the blades, such as current or voltage. FIG. 1 illustrates blower 160 as including an exhaust 180. An alternative embodiment for blower 160, such as an axial blower, is illustrated schematically in FIG. 2. Other possible embodiments are described in *Fans*, written by W. C. Osborne, and available from Pergamon Press (1977), herein incorporated by reference.

FIG. 1 also illustrates a fluid flow line 150 physically coupling pump 160 to the hood cavity and incorporating a flow sensor 130. Depending on the particular embodiment and the fluid, pump 160 may be coupled either pneumatically or hydraulically to hood 110. The fluid flow line may comprise a conventional flexible hose to accommodate vertical movement of the hood, such as a plastic hose. Likewise, a filter 170 positioned ahead of the pump in flow line 150 protects the pump from material or debris that may inadvertently enter the flow line. The flow sensor is adapted to measure the fluid flow rate through the fluid flow line. An example of such a sensor includes a Kurz thermal mass flow sensor. Other flow sensors are described in the Measurement Systems text referenced earlier.

The embodiment of system 100 illustrated in FIG. 1 includes a radially inward pneumatically inflatable seal adapted to receive engine combustor part 250. Thus, seal 120 should have the capability to directly contact or grip the inner or outer side of the wall of the part, as the case may be, so as to create a leak resistant seal around the part. This may be accomplished through the application of force by seal 120 to the part wall, such as with an inflatable seal. As illustrated in FIG. 3, the holes in the part above the bottom of hood 110, or more precisely, above the location of direct contact between seal 120 and the part, such as direct contact point 122 in FIG. 3, are sealed within the hood. Thus, the row of holes immediately below the bottom of seal 120, that is seal contact point 122, the location of direct contact between seal 120 and the part, are pneumatically isolated from the other holes in the part for fluid flow testing by system 100.

Figure 4:
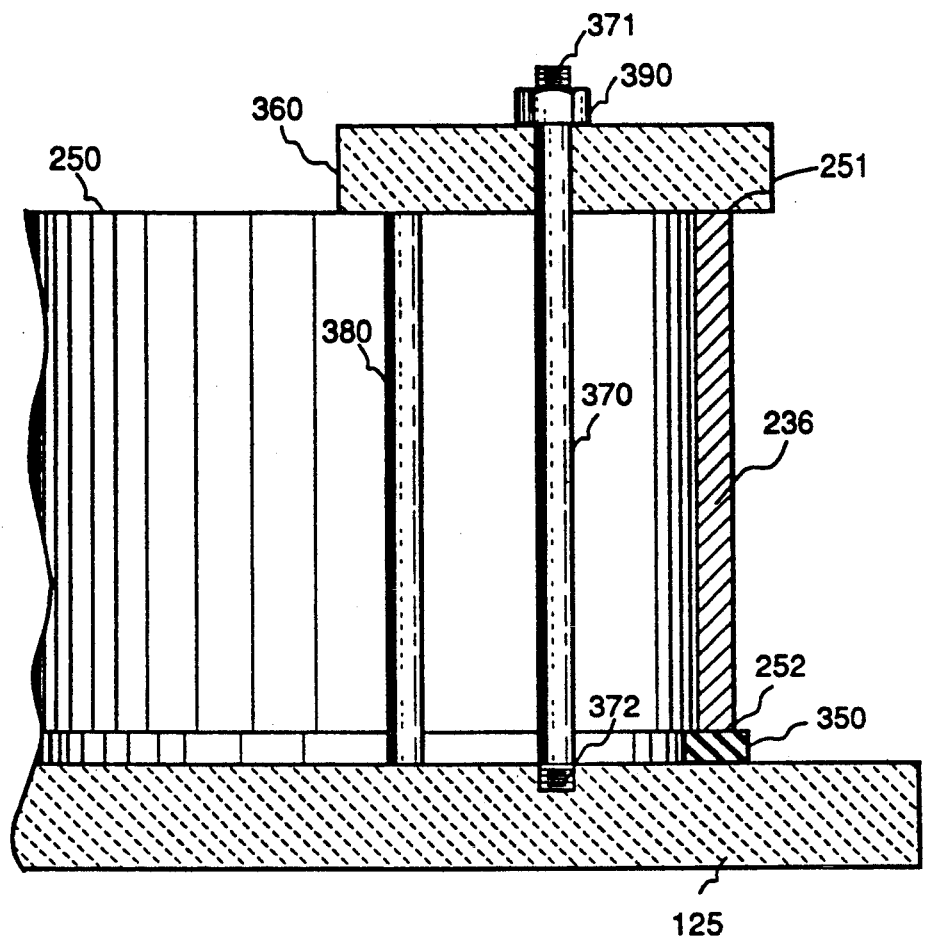
FIG. 4 is a side view illustrating a portion of the embodiment illustrated in FIG. 1 in greater detail.
Figure 4A:
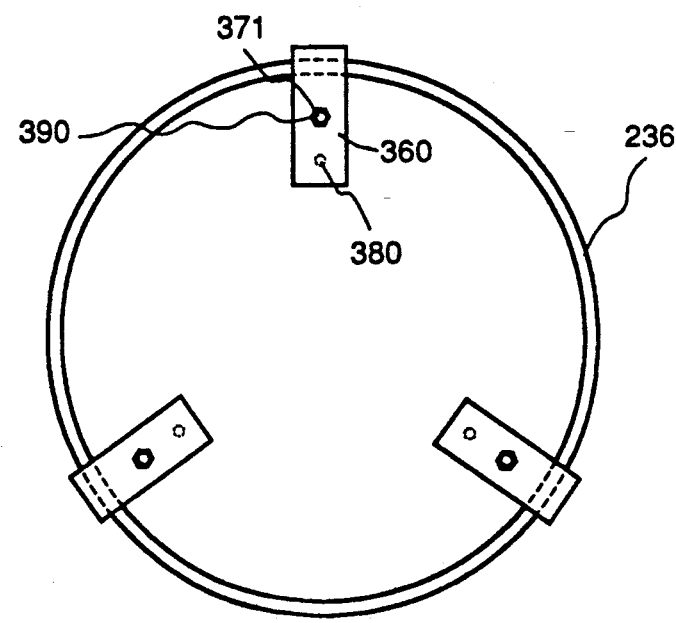
FIG. 4A is a top view of the portion of the embodiment of FIG. 1 illustrated in FIG. 4.

FIG. 4 illustrates one method of sealing the bottom end, 252, of part 250, that is the end not received by the cavity in hood 110. This is not necessary where the part already has one end closed or sealed. It will be appreciated that the bottom end is typically sealed, as shown in FIG. 4, before the hood is provided to engage the part wall with the seal. As illustrated, a wad of rubber 350, or other sealing material, is positioned between the bottom end 252 of wall 236 of part 250 and plate 125. A rectangular shaped plate 360 is oriented substantially perpendicular to and in direct contact with top end 251 of the wall. The rectangular plate has a hole for receiving a threaded end 371 of a pin 370, the other threaded end 372 of the pin being threadedly engaged into plate 125. A second pin 380 or other extended, substantially straight, member is oriented substantially parallel to pin 370, being lodged between the upper surface of plate 125 and the under surface of rectangular plate 360. Thus, as illustrated, part 250 is sealed by tightening a nut or other fastener 390 at threaded end 371 of pin 370 so as to exert a force on the top of part wall 251, making the bottom end 252 of the wall substantially leak-resistant by the force pushing bottom end 252 of the wall into direct contact with rubber sealing material 350. Likewise, as illustrated in FIG. 4A, this technique is applied at approximate 120° intervals around the circumference of the substantially circularly radially symmetrical part wall. It will be appreciated that many other sealing techniques may also prove satisfactory to make the bottom end of part 250 leak resistant.

As illustrated in FIG. 1, a motion system 200 within measuring system 100 includes a base 215. As illustrated, three vertically oriented, substantially parallel, vertical positioning screws 225 are attached to base 215. The vertical positioning screws are positioned around the circumference of a circle at approximately 120° increments. The vertical positioning screws are capable of rigidly supporting motor 220. As illustrated, plate 125 is positioned on top of and in direct contact with a motor 220. The plate may be bolted to motor 220. Likewise, combustor part 250 sits on top of plate 125. Thus, the rotation of plate 125 by motor 220 likewise rotates the part. As part 250 rotates, a laser beam (not shown) directed at the outer side of the curved wall of the part may form or fabricate a row of holes through the wall, as desired. It will nonetheless be appreciated that the invention is not limited in scope to a fluid flow measuring apparatus including a motion system. Likewise, the invention is not limited in scope to being employed in conjunction with a laser beam or any other system for fabricating the holes to be flow tested.

FIG. 1 also illustrates a computer 190 including a CRT display 195 providing the output signals of the flow sensor in a form capable of being perceived by an operator. Computer 190 is illustrated coupled to sensor 140; however, computer 190 may be electronically coupled to various components of system 100, such as seal 120, motion system 200 and a spacer system, if provided, to control various operations performed by the system. Thus, computer 190 may control the inflation and deflation of the seal, the relative height of part 250 with respect to the seal or seal contact point where a pneumatically or hydraulically controlled system for adjusting height is provided, and motion system 200, to rotate part 250 during formation or fabrication of the holes by the laser beam. Likewise, computer 190 may incorporate controller 130 and thus, may control pump or blower 160 in response to the signals provided by pressure sensor 210.

System 100 for measuring fluid flow through a plurality of holes in an engine combustor part operates in accordance with the following method. Combustor part 250 is positioned under hood 110, as illustrated in FIG. 1. Hood 110 is lowered or part 250 is raised to a level that leaves part 250 at least partially inside the hood cavity so that seal 120 may engage part 250. In this last step, part 250 is indexed up to flow hood 110, such as by positioning screws 225 or another vertical positioning system, or the hood is indexed down so that the last drilled row of holes, i.e., the row most remote from the hood, through which fluid flow is to be measured, may be pneumatically (or hydraulically) isolated by forming a seal around the part, such as with inflatable seal 120 (or a hydraulic seal). In particular, as illustrated in FIG. 3, the surface of seal 120 directly contacts the curved part wall above the last-drilled or most remote row of holes. For this particular embodiment of the invention, successive rows of holes are drilled below the most recently drilled row of holes. Seal 120 is inflated radially against the wall of part 250 to provide a substantially leak-resistant seal. As a result, the part is sealed in a cavity in a leak resistant hood so that at least one row of holes may constitute a passage into the hood cavity for fluid initially external to the hood cavity or a passage from the cavity for fluid initially inside the cavity. Pump or blower 160 is activated and controlled by controller 130 to establish a predetermined absolute pressure inside hood 110 or a predetermined differential pressure between the sealed volume inside hood 110 and the ambient environment by adjusting or lowering the pressure inside the hood cavity. As a result of the differential pressure established, fluid is either "pushed" or "pulled" through the holes in part 250 creating a fluid or mass flow depending on the differential pressure established. As fluid flows through flow line 150, flow sensor 140 measures the fluid flow rate, typically after the desired pressure is substantially achieved or measured inside the hood cavity.

While only certain features of the invention have been illustrated and described herein, many modifications, substitutions, changes, and equivalents will now occur to those skilled in the art. It is, therefore, to be understood that the appended claims are intended to cover all such modifications and changes as fall within the true spirit of the invention.

What is claimed is:

1. A system for measuring fluid flow through a plurality of holes in a part formed by a two-sided wall having an inner side and an outer side, said part having a primary axis and a first and second end with respect to said axis, said part further having a cross-section constituting a substantially smooth, closed figure taken along a plane oriented substantially perpendicular to said primary axis, the holes each extending from the inner side to the outer side of said wall, said system comprising:

a hood having a primary axis substantially parallel to the primary axis of said part and a hood cavity for receiving one of the ends of said part, said hood including a leak-resistant seal adapted to engage the outer side of the wall of the part;

a pump being coupled to said hood cavity by a fluid flow line and operable to affect pressure within said hood cavity;

a pressure sensor adapted to measure the pressure within said hood cavity;

a controller responsive to said pressure sensor, being coupled to said pump and adapted to establish a predetermined pressure inside said hood cavity by controlling said pump; and a fluid flow sensor incorporated in said flow line adapted to measure the fluid flow rate through said flow line.

2. The system of claim 1, wherein said pump comprises a variable pressure blower;

said blower being pneumatically coupled to said hood cavity by said fluid flow line.

3. The system of claim 1, wherein said pump is hydraulically coupled to said hood cavity by said fluid flow line.

4. The system of claim 2, wherein said leak-resistant seal comprises an inward pneumatically inflatable seal, said pressure sensor being adapted to measure the pressure within said hood cavity when said seal is inflated.

5. The system of claim 4, wherein the substantially smooth closed figure constitutes a substantially circularly radially symmetrical closed figure;

said leak-resistant seal comprising a radially inward pneumatically inflatable seal.

6. The system of claim 2, wherein said variable pressure blower comprises a variable pressure blower from the group consisting of a centrifugal blower and an axial fan.

7. The system of claim 1, wherein said controller comprises a microprocessor incorporating a closed loop feedback control algorithm.

8. The system of claim 7, wherein said microprocessor comprises a microprocessor incorporating a closed loop feedback control algorithm consisting of a fuzzy logic feedback control algorithm.

9. A system for measuring fluid flow through a plurality of holes in a part formed by a two-sided wall having an inner side and an outer side, said part having a primary axis and a first and second end with respect to said axis, said part further having a cross-section constituting a substantially smooth, closed figure taken along a plane oriented substantially perpendicular to said primary axis, the holes each extending from the inner side to the outer side of said wall, said system comprising:
   a hood having a primary axis substantially parallel to the primary axis of said part and a hood cavity for receiving one of the ends of said part, said hood including a leak-resistant seal adapted to engage the outer side of the wall of the part;
   a variable pressure blower being coupled to said hood cavity by a fluid flow line and operable to affect the pressure inside said hood cavity;
   a pressure sensor adapted to measure differential pressure between the pressure inside said hood cavity and the pressure outside said hood cavity;
   a controller responsive to said pressure sensor, being coupled to said blower and adapted to establish a predetermined differential pressure between the pressure inside said hood cavity and outside said hood cavity by controlling said blower; and
   a fluid flow sensor incorporated in said flow line adapted to measure the fluid flow rate through said flow line.

10. A system for measuring fluid flow through a plurality of holes in a part formed by a two-sided wall having an inner side and an outer side, said part having a primary axis and a first and second end with respect to said axis, said part further having a cross-section constituting a substantially smooth, closed figure taken along a plane oriented substantially perpendicular to said primary axis, the holes each extending from the inner side to the outer side of said wall, said system comprising:
   a hood having a primary axis substantially parallel to the primary axis of said part and a hood cavity, said hood including a leak-resistant seal adapted to engage the inner side of the wall of the part;
   a pump being coupled to said hood by a fluid flow line and operable to affect the pressure within said hood cavity;
   a pressure sensor adapted to measure the pressure within said hood cavity;
   a controller responsive to said pressure sensor, being coupled to said pump and adapted to establish a predetermined pressure in said hood cavity by controlling said pump; and
   a fluid flow sensor incorporated in said flow line adapted to measure the fluid flow rate through said flow line.

11. The system of claim 10, wherein said pump comprises a variable pressure blower;
   said blower being pneumatically coupled to said hood cavity by said fluid flow line.

12. The system of claim 10, wherein said pump is hydraulically coupled to said hood cavity by said fluid flow line.

13. The system of claim 11, wherein said leak-resistant seal comprises an outward pneumatically inflatable seal, said pressure sensor being adapted to measure the pressure within said hood cavity when said seal is inflated.

14. The system of claim 13, wherein the substantially smooth closed figure constitutes a substantially circularly radially symmetrical closed figure;
   said leak-resistant seal comprising a radially outward pneumatically inflatable seal.

15. The system of claim 11, wherein said variable pressure blower comprises a variable pressure blower from the group consisting of a centrifugal blower and an axial fan.

16. The system of claim 10, wherein said controller comprises a microprocessor incorporating a closed loop feedback control algorithm.

17. The system of claim 16, wherein said microprocessor comprises a microprocessor incorporating a closed loop feedback control algorithm consisting of a fuzzy logic feedback control algorithm.

18. A method for measuring the fluid flow through a plurality of holes forming at least one row in a two-sided wall having an inner and outer side, said wall forming a part, said method comprising the steps of:
   sealing the part in a hood cavity in a leak-resistant hood so that said at least one row of holes constitutes a passage for fluid between the hood cavity and the environment external to the hood cavity;
   adjusting pressure inside the hood cavity so as to substantially create a predetermined differential pressure between the pressure inside the hood cavity and the pressure external to the hood cavity; and
   measuring the fluid flow through said at least one row of holes after the pressure is substantially adjusted inside the hood cavity.

19. The method of claim 18, wherein the step of adjusting the pressure inside the hood cavity comprises one of the group consisting of raising the hood cavity pressure and reducing the hood cavity pressure.

20. The method of claim 18, and further comprising, before the step of sealing,
   drilling said at least one row of holes in said part.

* * * * *